US012574356B2

(12) United States Patent
Yu et al.

(10) Patent No.: US 12,574,356 B2
(45) Date of Patent: Mar. 10, 2026

(54) BANDWIDTH CONTROLLED MULTI-PARTY JOINT DATA PROCESSING METHODS AND APPARATUSES

(71) Applicant: Alipay (Hangzhou) Information Technology Co., Ltd., Hangzhou (CN)

(72) Inventors: Chaofan Yu, Hangzhou (CN); Lei Wang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 339 days.

(21) Appl. No.: 18/482,706

(22) Filed: Oct. 6, 2023

(65) Prior Publication Data

US 2024/0039896 A1 Feb. 1, 2024

Related U.S. Application Data

(63) Continuation of application No. PCT/CN2022/085259, filed on Apr. 6, 2022.

(30) Foreign Application Priority Data

Apr. 8, 2021 (CN) .......................... 202110378007.7

(51) Int. Cl.
$H04L\ 9/40$ (2022.01)
$G06F\ 7/58$ (2006.01)
(52) U.S. Cl.
CPC .......... $H04L\ 63/0407$ (2013.01); $G06F\ 7/588$ (2013.01)
(58) Field of Classification Search
CPC . H04L 63/0407; H04L 63/0421; H04L 9/083; H04L 2209/46; G06F 7/588; G06F 21/6245
See application file for complete search history.

(56) References Cited

U.S. PATENT DOCUMENTS 10,673,625 B1 6/2020 Behnia et al.
12,450,226 B1 * 10/2025 Ross ................... G06F 16/2379
(Continued)

FOREIGN PATENT DOCUMENTS

CN 109359470 2/2019
CN 110661764 1/2020
(Continued)

OTHER PUBLICATIONS

Chen et al., "A kind of Secure Identity Authentication Method Based on Contact Signals for Internet of Things," Netinfo Security, Nov. 10, 2018, 18(11):40-48 (with English Abstract).
(Continued)

*Primary Examiner* — Aftab N. Khan
(74) *Attorney, Agent, or Firm* — Fish & Richardson P.C.

(57) ABSTRACT

Bandwidth-controlled, private, multi-party joint data processing is described. When performing an $n^{th}$ iteration of joint data processing on service data, multiple participants separately determine a same $n^{th}$ identifier at the current iteration and includes sub-identifiers separately corresponding to service data of the multiple participants. The multiple participants are enabled to separately determine their respective random arrays in a predetermined trusted interaction manner and based on the $n^{th}$ identifier and initial seeds of the multiple participants. When a first sub-identifier exists in a correspondence between sub-identifiers and confidential data, the multiple participants separately obtain first confidential data corresponding to the first sub-identifier and perform the current iteration of joint data processing with another participant using secure multi-party computation (MPC) based on exchange of other confidential data and respective first confidential data. The first confidential data is obtained by fusing first service data and a corresponding first random number.

19 Claims, 7 Drawing Sheets

(56) References Cited

U.S. PATENT DOCUMENTS

| | | | | |
|---|---|---|---|---|
| 12,450,617 | B1 * | 10/2025 | Balaoro | G06N 3/04 |
| 2009/0287837 | A1 * | 11/2009 | Felsher | G06F 21/6245 |
| | | | | 709/229 |
| 2018/0019867 | A1 * | 1/2018 | Davis | H04L 9/0637 |
| 2019/0080392 | A1 * | 3/2019 | Youb | G06Q 20/065 |
| 2019/0215154 | A1 | 7/2019 | Simplicio Jr et al. | |
| 2020/0014703 | A1 | 1/2020 | Furukawa et al. | |
| 2020/0162550 | A1 * | 5/2020 | Destefanis | H04L 63/123 |
| 2020/0226284 | A1 * | 7/2020 | Yin | G06F 21/6254 |
| 2020/0396063 | A1 | 12/2020 | Veeningen | |
| 2024/0170113 | A1 * | 5/2024 | Schneider | G06F 21/64 |
| 2025/0192994 | A1 * | 6/2025 | Yeo | G06F 16/285 |

FOREIGN PATENT DOCUMENTS

| | | |
|---|---|---|
| CN | 111401479 | 7/2020 |
| CN | 111523144 | 8/2020 |
| CN | 111563261 | 8/2020 |
| CN | 111885079 | 11/2020 |
| CN | 111901111 | 11/2020 |
| CN | 112395633 | 2/2021 |
| CN | 113179158 | 7/2021 |
| WO | WO 2022213965 | 10/2022 |

OTHER PUBLICATIONS

Huang et al., "Research on data privacy protection scheme under cloud service application mode," data security and cloud computing, Dec. 15, 2016, 2 pages (with machine translated abstract).
International Preliminary Report on Patentability in Appln. No. PCT/CN2022/085259, mailed on Oct. 19, 2023, 7 pages.
International Search Report and Written Opinion in Appin. No. PCT/CN2022/085259, mailed on Jun. 16, 2022, 14 pages (with English translation).

* cited by examiner

Alice owns a matrix X

Bob owns a matrix Y

Offline phase

Step 1 — Obtain $U_1, V_1, W_1$

Generate a random number

Obtain $U_2, V_2, W_2$

Online phase

Step 2 — Randomly generate $X_1$ $X_2 = X - X_1$ $Y_1 = Y - Y_2$

Randomly generate $Y_2$

Step 3 — $D_1 = X_1 - U_1$   $E_1 = Y_1 - V_1$ $D_1, E_1$ $D_2, E_2$ $D_2 = X_2 - U_2$   $E_2 = Y_2 - V_2$ Step 4 —
$D = D_1 + D_2$
$E = E_1 + E_2$
$Z_2 = W_1 + E \cdot U_1 + D \cdot V_1 + D \cdot E$ $D = D_1 + D_2$
$E = E_1 + E_2$
$Z_2 = W_2 + E \cdot U_2 + D \cdot V_2$ $Z_1 + Z_2 = X \cdot Y$

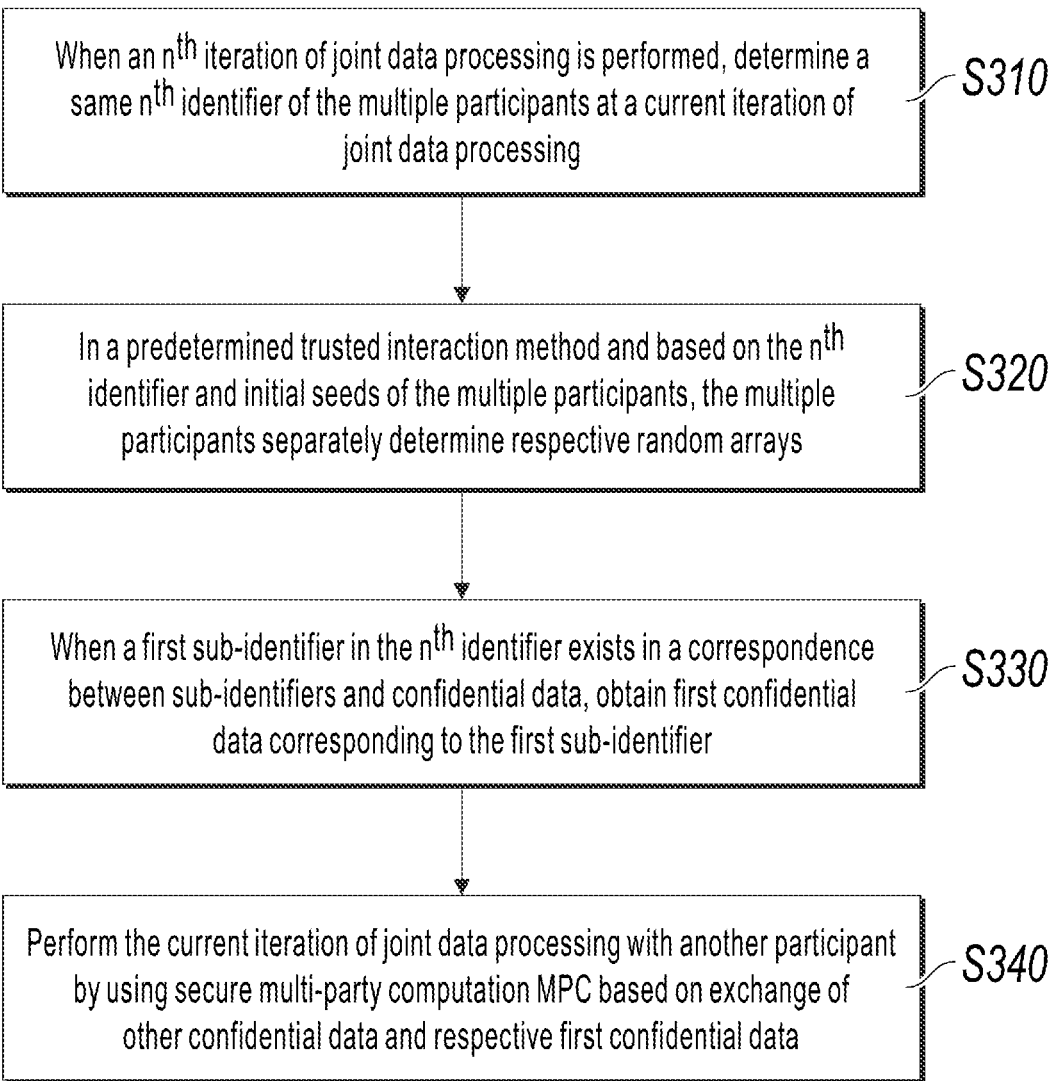

When an $n^{th}$ iteration of joint data processing is performed, determine a same $n^{th}$ identifier of the multiple participants at a current iteration of joint data processing — S310

In a predetermined trusted interaction method and based on the $n^{th}$ identifier and initial seeds of the multiple participants, the multiple participants separately determine respective random arrays — S320

When a first sub-identifier in the $n^{th}$ identifier exists in a correspondence between sub-identifiers and confidential data, obtain first confidential data corresponding to the first sub-identifier — S330

Perform the current iteration of joint data processing with another participant by using secure multi-party computation MPC based on exchange of other confidential data and respective first confidential data — S340

FIG. 3

$$Z_1 + Z_2 = X \cdot Y$$

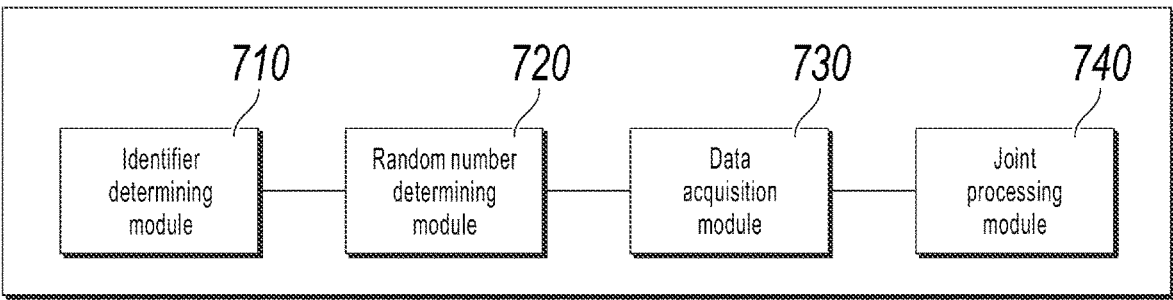
FIG. 7

BANDWIDTH CONTROLLED MULTI-PARTY JOINT DATA PROCESSING METHODS AND APPARATUSES

CROSS-REFERENCE TO RELATED APPLICATIONS

This application is a continuation of PCT Application No. PCT/CN2022/085259, filed on Apr. 6, 2022, which claims priority to Chinese Patent Application No. 202110378007.7, filed on Apr. 8, 2021, and each application is hereby incorporated by reference in its entirety.

TECHNICAL FIELD

One or more embodiments of this specification relate to the field of data processing technologies, and in particular, to bandwidth controlled multi-party joint data processing methods and apparatuses.

BACKGROUND

With development of computer technologies, the demand for a service platform such as an enterprise or an organization to improve a service capability by using service data is growing. The service data include various data in a service acceptance process of a user on the service platform, and processing and analyzing the service data help improve a service level of the service platform. Different service platforms work together to analyze and process service data, making an analysis result more comprehensive and profound. However, the service data are usually private data of the service platform, and cannot be directly and jointly processed with service data of another service platform. Therefore, a relatively high privacy protection requirement exists.

Secure Multi-party Computation (MPC) is a privacy technology that uses pure cryptography to protect the computing process involving multi-party data without revealing any participant data. In a process of performing multi-party joint data processing by using MPC, service data of a participant are not directly sent to other participants, and joint processing of the service data can be implemented by exchanging out-of-order data between multiple participants for multiple iterations. Currently, there is a requirement for performing joint data processing between multiple participants by using MPC in a large volume and in a high density, and there is a requirement for reducing bandwidth consumption and improving joint data processing efficiency while ensuring data privacy and security.

Therefore, an improved solution is desired to reduce bandwidth consumption, improve processing efficiency of a joint data processing process, and ensure data privacy and security.

SUMMARY

One or more embodiments of this specification describe bandwidth controlled multi-party joint data processing methods and apparatuses, so as to reduce bandwidth consumption, improve processing efficiency in a joint data processing process, and ensure data privacy and security. A specific technical solution is as follows:

According to a first aspect, an embodiment provides a bandwidth controlled multi-party joint data processing method, which is used to perform private joint data processing on service data of multiple participants, where the service data include feature data of multiple objects, and the method is performed by any participant of the multiple participants and includes: when performing an $n^{th}$ iteration of joint data processing, determining a same $n^{th}$ identifier of the multiple participants at a current iteration of joint data processing, where the $n^{th}$ identifier includes sub-identifiers respectively corresponding to the service data of the multiple participants; in a predetermined trusted interaction manner and based on the $n^{th}$ identifier and initial seeds of the multiple participants, the multiple participants separately determining respective random arrays, where the random arrays include multiple random numbers respectively corresponding to multiple sub-identifiers, and the random arrays of the multiple participants satisfy a predetermined relationship during presumed reconstruction; when a first sub-identifier in the $n^{th}$ identifier exists in a correspondence between sub-identifiers and confidential data, obtaining first confidential data corresponding to the first sub-identifier, where the first confidential data are obtained by fusing first service data and a corresponding first random number in advance; and performing the current iteration of joint data processing with another participant by using secure multi-party computation (MPC) based on exchange of other confidential data and respective first confidential data, where the other confidential data are obtained by fusing other service data and a corresponding random number.

According to a second aspect, an embodiment provides a bandwidth controlled multi-party joint data processing apparatus, used to perform private joint data processing on service data of multiple participants, where the service data include feature data of multiple objects, and the apparatus is deployed in any participant of the multiple participants and includes: an identifier determining module, configured to: when an $n^{th}$ iteration of joint data processing is performed, determine a same $n^{th}$ identifier of the multiple participants at a current iteration of joint data processing, where the $n^{th}$ identifier includes sub-identifiers respectively corresponding to the service data of the multiple participants; a random number determining module, configured to, in a predetermined trusted interaction manner and based on the $n^{th}$ identifier and initial seeds of the multiple participants, the multiple participants separately determine respective random arrays, where the random arrays include multiple random numbers respectively corresponding to multiple sub-identifiers, and the random arrays of the multiple participants satisfy a predetermined relationship during presumed reconstruction; a data acquisition module, configured to: when a first sub-identifier in the $n^{th}$ identifier exists in a correspondence between multiple sub-identifiers and confidential data, obtain first confidential data corresponding to the first sub-identifier, where the first confidential data are obtained by fusing first service data and a corresponding first random number in advance; and a joint processing module, configured to: perform the current iteration of joint data processing with the multiple participants by using secure multi-party computation (MPC) based on exchange of other confidential data and respective first confidential data, where the other confidential data are obtained by fusing other service data and a corresponding random number.

According to a third aspect, an embodiment provides a computer-readable storage medium that stores a computer program, where when the computer program is executed on a computer, the computer is enabled to perform the method according to any one of the first aspect.

According to a fourth aspect, an embodiment provides a computing device, including a memory and a processor. Executable code is stored in the memory, and when executing the executable code, the processor implements the method according to any one of the first aspect.

In the method and the apparatus provided in the embodiments of this specification, when a first sub-identifier exists in a pre-stored correspondence between sub-identifiers and confidential data, corresponding first confidential data can be obtained therefrom. When joint data processing is performed by using MPC, multiple participants do not need to exchange the first confidential data again. In a scenario in which joint data processing is performed multiple iterations, when service data of a participant are reused in a next iteration of joint data processing, confidential data related to the service data do not need to be obtained through interaction between multiple participants, thereby reducing bandwidth consumption between the multiple participants, improving processing efficiency, and ensuring privacy and security of the data in an entire execution process.

BRIEF DESCRIPTION OF DRAWINGS

To describe the technical solutions in the embodiments of this specification more clearly, the following briefly describes the accompanying drawings needed for describing the embodiments. Clearly, the accompanying drawings in the following description show merely some embodiments of this specification, and a person of ordinary skill in the art can still derive other drawings from these accompanying drawings without creative efforts.

FIG. 3 is a schematic flowchart illustrating a multi-party joint data processing method, according to an embodiment;

FIG. 7 is a schematic block diagram illustrating a multiparty joint data processing apparatus, according to an embodiment.

DESCRIPTION OF EMBODIMENTS

The following describes the solutions provided in this specification with reference to the accompanying drawings.

Figure 1:
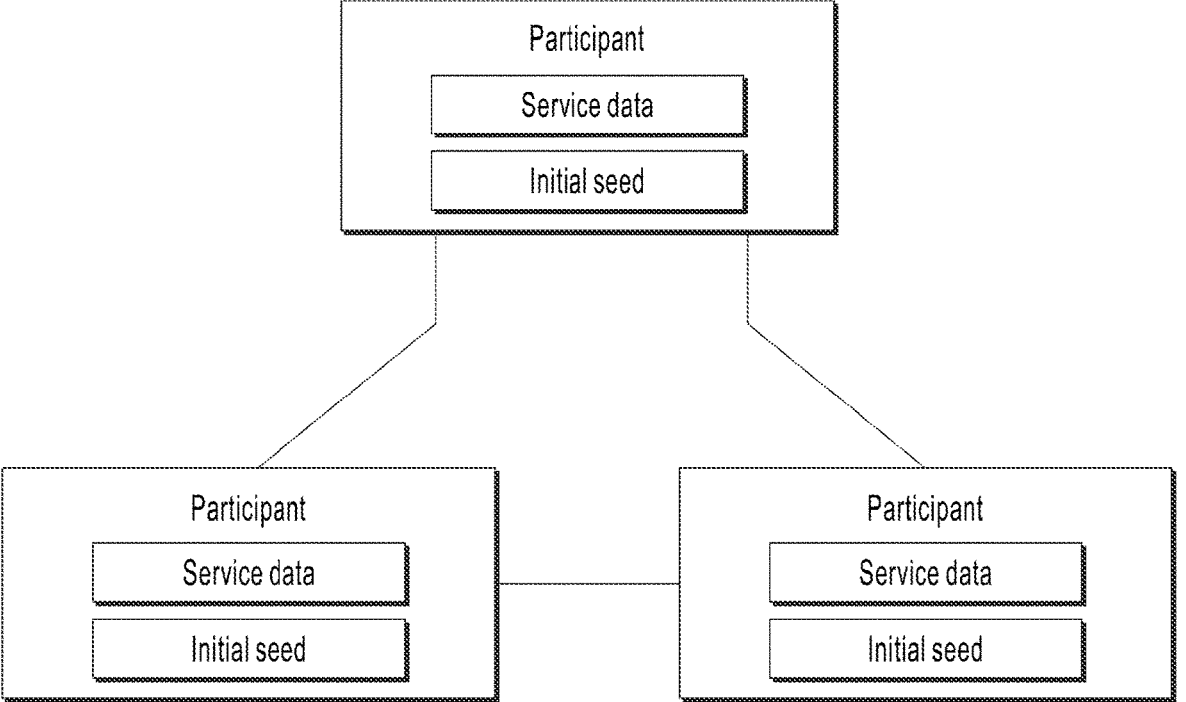
FIG. 1 is a schematic diagram illustrating an implementation scenario of an embodiment disclosed in this specification.

FIG. 1 is a schematic diagram illustrating an implementation scenario of an embodiment disclosed in this specification. Multiple participants own respective service data, and the service data are private data of the participants. Each participant also has its own initial seed, and the initial seed is used to generate a random number. The multiple participants can be communicatively connected to each other for joint data processing. In an actual application, a quantity of participants in joint data processing can be two or more. FIG. 1 is merely a schematic diagram of an implementation scenario, and is not intended to limit this embodiment of this specification. More embodiment scenarios can be obtained by updating the scenario shown in FIG. 1.

The participants can be different service platforms, such as various enterprises or organizations, which respectively store service data, and the service data can be related to features of a specific object. The object can be but is not limited to any one of a user, a product, an event, etc. For example, a user can use a service provided by a bank, an insurance company, or a shopping company, and service data related to the user exists in these organizations or enterprises. If these organizations or enterprises perform joint processing on the service data of all parties, for example, they can jointly evaluate a credit rating and a risk rating of the user, an obtained data processing result will be more comprehensive and accurate.

Specifically, the service data can include feature data of multiple objects, and the feature data include at least one of the following: basic attribute information, association relationship information, interaction information, and historical behavior information. For example, when the object is a user, basic attribute information of the user can include a gender, an age, an income, etc. of the user, association relationship information of the user can include another user, a company, a region, etc. that have an association relationship with the user, interaction information of the user can include information such as a click, a view, and an activity that the user performs or participates on a website, and historical behavior information of the user can include a historical transaction behavior, payment behavior, purchase behavior, etc. of the user. When the object is a product, basic attribute information of the product can include a type, a place of origin, a price, etc. of the product, association relationship information of the product can include a user, a store, another product, etc. that have an association relationship with the product, interaction information of the product can include an interaction feature between the user, the store, and the product, and historical behavior information of the product can include information such as purchase, redeposit, and return of the product. When the object is an event, basic attribute information of the event can be text information used to describe the event, association relationship information can include a text that has a relationship with the event in a context, other event information that has a relationship with the event, etc., and historical behavior information can include record information about a development change of the event in a time dimension, etc. The service data are usually private data of the service platform, and relatively high privacy and security are required in a processing process.

Service data of each participant can be represented in a form of a matrix, for example, can be represented by using an N*M-dimensional matrix, where both M and N are integers, the matrix includes feature data of N objects, and feature data of each object include characteristic values of M attribute features. Values of M or N of different participants can be different, or can be the same. In an implementation, the service data can be a matrix obtained after dimension reduction processing or other processing.

Secure multi-party computation (MPC) is an existing data privacy protection technology that can be used for multi-party participation, and a specific implementation thereof includes technologies such as homomorphic encryption, garbled circuits, oblivious transfer, and secret sharing. MPC is usually divided into an offline phase and an online phase. The offline phase is mainly used to generate an offline factor, for example, a triplet (beaver triple). Generation of the offline factor does not depend on online data processing, and can be generated in advance. The offline phase and the online phase are in a relative relationship. The online phase can be understood as a phase in which joint data processing is performed by using the offline factor generated in the offline phase.

Figure 2:
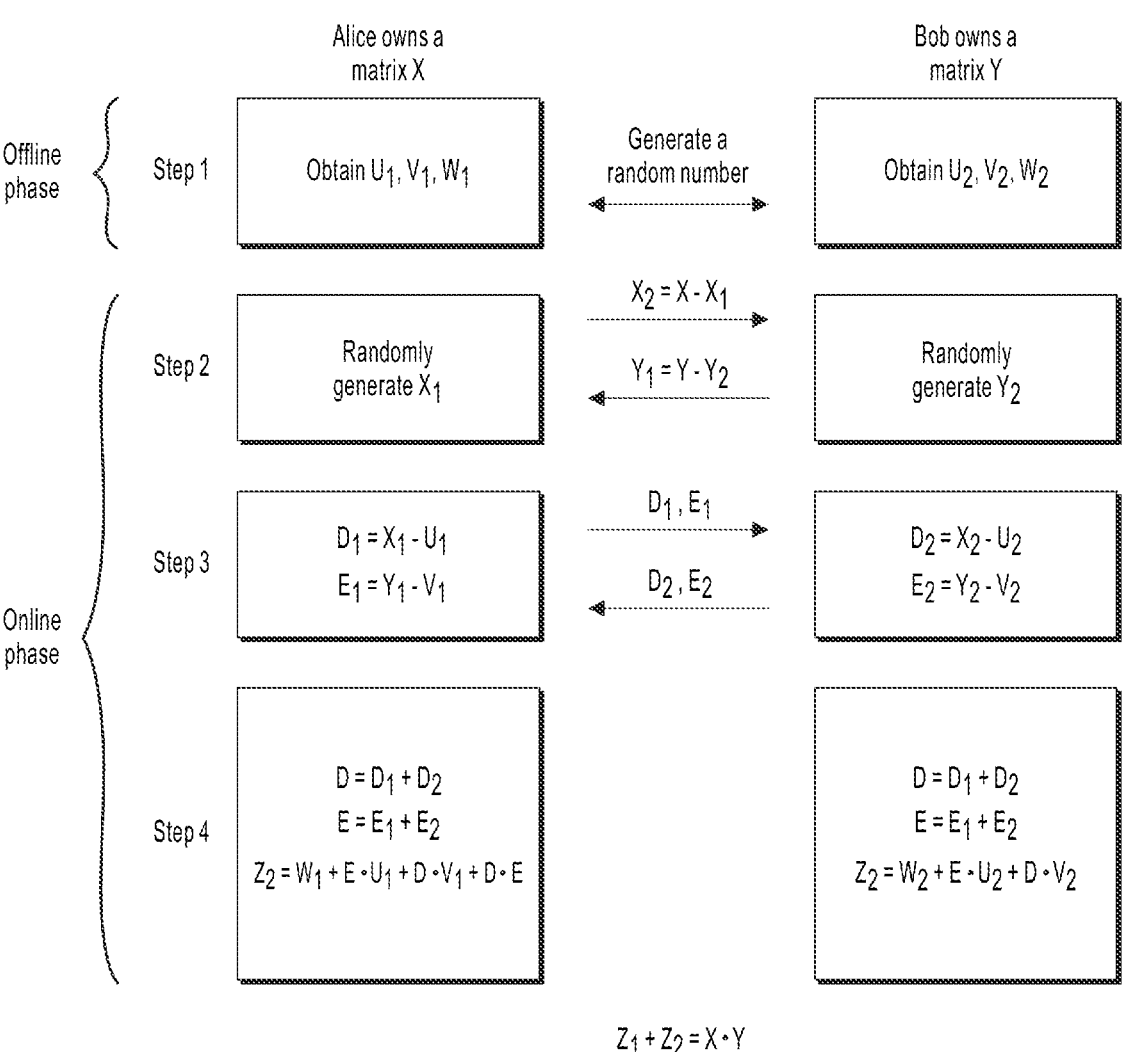
FIG. 2 is a schematic diagram illustrating joint data processing performed by two participants through secret sharing.

To describe a multi-party secure computing process more clearly, the following uses a secret sharing technology as an example to describe an offline phase and an online phase when joint data processing is performed between multiple participants. FIG. 2 is a schematic diagram illustrating joint data processing performed by two participants through secret sharing. Assume that participant Alice has a matrix X, and participant Bob has a matrix Y. The matrix X and the matrix Y are respectively data matrices corresponding to service data of the two participants.

Step 1: In an offline phase, participant Alice and participant Bob separately obtain offline factors (U1, V1, and W1) and (U2, V2, and W2), where matrices U1 and U2 here are the same as X in dimension, matrices V1 and V2 here are the same as Y in dimension, and (U1+U2)*(V1+V2)=(W1+W2). This is an offline phase.

Step 2: Alice randomly generates a matrix X1, obtains a fragment X2=X−X1, and sends X2 to Bob. In addition, Bob also randomly generates a matrix Y2, obtains a fragment Y1=Y−Y2, and sends Y1 to Alice. As such, Alice and Bob respectively have X1, Y1 and X2, Y2.

Step 3: Compute D and E under a finite field. Alice performs computing according to the following equation: D1=X1−U1, and E1=Y1−V1. Bob performs computing according to the following equation: D2=Y2−U2, and E2=Y2−V2. The two parties exchange D1, E1 and D2, E2.

Step 4: Alice obtains a fragment Z1 by computing the following equation:

$$D=D1+D2, E=E1+E2$$

$$Z1=W1+E-U1+D-V1+D-E$$

Bob obtains a fragment Z2 by computing the following equation:

$$D=D1+D2, E=E1+E2$$

$$Z2=W2+E-U2+D-V2$$

It can be verified that Z1+Z2=X−Y.

Therefore, when the original matrices X and Y are not exposed, the two holders respectively obtain the fragments Z1 and Z2 of matrix multiplication, and can obtain the fragment from the other holder to obtain a result of X·Y. The above steps 2, 3 and 4 are in the online phase. The above-mentioned joint data processing shown in the online phase is merely an example, and does not constitute a limitation on this specification. In practice, the joint data processing process in the online phase can further include more other manners.

The offline factor can be a random array including multiple random numbers. The random number in the random array can be corresponding to service data of the participant. For example, in the example shown in FIG. 2, the offline factors (U1, V1, W1) and (U2, V2, W2) respectively form a random array, where the random numbers U1 and U2 are corresponding to service data X of participant Alice and are used to be fused with the service data X and related data thereof, so as to ensure that privacy is not leaked. The random numbers V1 and V2 are corresponding to service data Y of participant Bob, and are used to be fused with the service data Y and related data thereof, so as to ensure that privacy is not leaked. In another specific implementation, the random numbers U1 and U2 not limited to be fused only with the service data X and the related data thereof, and the random numbers V1 and V2 are not limited to be fused only with the service data Y and the related data thereof. Overlapping and fusion can also be performed between the random numbers and the service data. For example, the random numbers V1 and V2 can be further used to fuse the service data X and the related data thereof.

In conclusion, in the online phase, the random number and the service data are fused, so a confidential matrix of the service data can be obtained. On the basis of exchanging confidential matrices with each other, each participant can perform joint data processing, thereby ensuring privacy of the service data. Random arrays should be different for each iteration of joint data processing to improve data privacy.

In one iteration of joint data processing, several data exchanges need to be performed between multiple participants. However, when the service data belong to a high-dimensional matrix, a data volume during interaction between participants is also very large, and consumption of bandwidth is very high. For example, in step 2 and step 3 of the example shown in FIG. 2, matrix dimension quantities of X2, D1, and D2 are the same as those of the service data X, and matrix dimension quantities of Y1, E1, and E2 are the same as those of the service data Y. When the matrix dimension quantities of the service data X and Y are very large, a bandwidth occupation amount caused by interaction is also very high. Especially, when multiple participants perform high-frequency joint data processing, a function of the bandwidth occupation amount in affecting processing efficiency is also greater.

To reduce bandwidth consumption between multiple participants and improve processing efficiency, an embodiment of this specification provides a bandwidth controlled multiparty joint data processing method for. When an $n^{th}$ iteration of joint data processing is performed, any participant of multiple participants determines a same $n^{th}$ identifier of the multiple participants at a current iteration of joint data processing, where the $n^{th}$ identifier includes sub-identifiers respectively corresponding to service data of the multiple participants; in a predetermined trusted interaction manner and based on the $n^{th}$ identifier and initial seeds of the multiple participants, the multiple participants separately determine respective random arrays, where the random arrays include multiple random numbers respectively corresponding to multiple sub-identifiers, and the multiple random arrays satisfy a predetermined relationship during presumed reconstruction; when a first sub-identifier in the $n^{th}$ identifier exists in a correspondence between sub-identifiers and confidential data, obtains first confidential data corresponding to the first sub-identifier; and performing the current iteration of joint data processing with another participant by using MPC based on exchange of other confidential data and respective first confidential data. The first confidential data are obtained by fusing first service data and a corresponding first random number in advance, and other confidential data are obtained by fusing other service data and a corresponding random number.

In this embodiment of this specification, when first confidential data corresponding to a first sub-identifier are obtained from a pre-stored sub-identifier and confidential data, the first confidential data do not need to be exchanged between multiple participants, so reuse of some of the confidential data can be implemented in multiple iterations of joint data processing, bandwidth consumption between the multiple participants is reduced, and processing efficiency is improved. In addition, in different joint data processing processes, random arrays of the same participant are also different due to an $n^{th}$ identifier, which ensures data privacy and security as much as possible.

The following describes specific embodiments of this specification.

FIG. 3 is a schematic flowchart illustrating a multi-party joint data processing method, according to an embodiment. The method is used to perform private joint data processing on service data of multiple participants. The service data include feature data of multiple objects. The method can be performed by any participant of the multiple participants. In this specification, any participant can be implemented by using any apparatus, device, platform, device cluster, etc. that has a computing and processing capability. For ease of description, the following examples use two participants as an example for description. For example, the two partici- pants are a first participant A and a second participant B respectively. The method in this embodiment includes steps S310 to S340. Step S310: When an $n^{th}$ iteration of joint data processing is performed, determine a same $n^{th}$ identifier of the multiple participants at a current iteration of joint data processing. The $n^{th}$ identifier includes sub-identifiers respec- tively corresponding to the service data of the multiple participants.

n is a natural number. The $n^{th}$ identifier can be represented by uuid, and includes multiple sub-identifiers. The sub- identifier can be corresponding to the service data of the participant. For example, there are two participants: a first participant A and a second participant B, whose service data are respectively represented by X and Y. For any participant, an $n^{th}$ identifier of the participant includes a sub-identifier x corresponding to the service data X and a sub-identifier y corresponding to the service data Y. In this case, the $n^{th}$ identifier can be represented as (x, y).

The $n^{th}$ identifier can further include a sub-identifier that is not corresponding to the service data of the participant, for example, can include a sub-identifier corresponding to a data processing result. The data processing result is a result obtained after joint data processing is performed on service data of multiple participants. The sub-identifier can be a z identifier, and the $n^{th}$ identifier can be represented by (x, y, z).

Different iterations of joint data processing are corre- sponding to different identifiers, for example, the $n^{th}$ iden- tifier is different from an $(n+1)^{th}$ identifier and an $(n-1)^{th}$ identifier. That the $n^{th}$ identifier is different from any $m^{th}$ identifier can be understood as: When sub-identifiers in the $n^{th}$ identifier are separately compared with sub-identifiers in the $m^{th}$ identifier, the multiple sub-identifiers are not com- pletely the same. For example, in a value (xn, yn, zn) of the $n^{th}$ identifier and a value (xm, ym, zm) of the $m^{th}$ identifier, xn and xm, yn and ym, and zn and zm are not completely the same. m is a natural number.

The $n^{th}$ identifier or the $m^{th}$ identifier is an identifier used to generate a random number. In different iterations of joint data processing, random arrays of participants need to be different. The sub-identifier can be a value within an integer range. For example, the $n^{th}$ identifier can be (3, 4, 5) etc.

Multiple participants can perform joint data processing for multiple iterations, and service data of the participants can be reused in different iterations of joint data processing. For example, in the first iteration of joint data processing, service data of the first participant A is a matrix X1, service data of the second participant B is a matrix Y1, and computing in joint data processing includes X1·Y1. In the second iteration of joint data processing, the service data of the first participant A is the matrix X1, the service data of the second participant B is a matrix Y2, and computing in joint data processing includes X1·Y2. As such, in the two itera- tions of joint data processing, the matrix X1 of the service data can be reused. In the above-mentioned analysis, any participant does not know a specific value included in service data of the other participant. The participants can determine, in multiple manners, which service data are to be reused. For example, at an application layer, multiple par- ticipants can notify each other of reused service data by sending a message, or can confirm the reused service data in a manner of obtaining a message from a third party, or the multiple participants can determine the reused service data through setting by an administrator.

For any participant, when an $n^{th}$ identifier that is of the multiple participants and that is the same at a current iteration is determined, the following processing can be performed according to different cases. For example, when service data X of a participant in the current iteration of joint data processing are the same as service data X of the participant in joint data processing that has been performed, a sub-identifier corresponding to the service data X in the joint data processing that has been performed is determined as a sub-identifier of the service data X at the current iteration.

When the service data Y of the participant in the current iteration of joint data processing are not the same as the service data Y of the participant in the joint data processing that has been performed, the sub-identifier of the service data Y at the current iteration is determined based on a value different from the sub-identifier corresponding to the service data Y in the joint data processing that has been performed.

For example, both service data of the first participant A in the current iteration of joint data processing and service data of the first participant A in an $m^{th}$ iteration of joint data processing that has been performed are a matrix X1. In this case, a sub-identifier 3 that is corresponding to the service data of the first participant A and that is in an $m^{th}$ identifier (3, 4, 5) can be determined as a value of a corresponding sub-identifier in the $n^{th}$ identifier in the current iteration of joint data processing, for example, (3, x, x).

In addition, when service data Y1 of the second partici- pant B in the current iteration of joint data processing is different from service data Y2 of the second participant B in any iteration of joint data processing that has been per- formed, assume that an $m^{th}$ iteration of joint data processing has been performed, when a value of x in (3, x, x) is determined, the value of x should be different from 4 in the $m^{th}$ identifier (3, 4, 5).

When the above-mentioned implementation is specifi- cally implemented, it can be assumed that service data of each participant are corresponding to one counter, and a value of a corresponding sub-identifier is determined based on a value of the counter. The multiple participants have the same initial value of the counter corresponding to the service data, and update modes are the same. The update mode indicates whether a value is increased or decreased each time the value is updated, and an increase or decrease amount each time. The determining the sub-identifier of the service data Y at the current iteration based on a value different from the sub-identifier corresponding to the service data Y in the joint data processing that has been performed can specifically include: determining the sub-identifier of the service data Y at the current iteration based on an updated value of a counter corresponding to the service data Y. The value of the counter can be updated each time when one iteration of joint data processing starts, or can be updated each time when one iteration of joint data processing ends. This is not specifically limited in this specification.

The sub-identifier of the service data Y at the current iteration can be determined in multiple manners based on the updated value of the counter corresponding to the service data Y. For example, the updated value is directly determined as the sub-identifier. Or the sub-identifier can be determined based on a hash value of the updated value.

With reference to the above-mentioned implementation, the following lists a correspondence between multiple parameters in this example by using Table 1.

separately generated by using the respective initial seeds and the $n^{th}$ identifier, and respective random arrays are separately obtained based on the random numbers by exchanging data with each other. For a more specific implementation process, refer to an existing manner of generating a random array. Details are omitted here for simplicity.

In a second manner, the multiple participants obtain, by using a trusted third party, random arrays that satisfy the participants. This manner also includes multiple implemen-

TABLE 1

| | $m^{th}$ identifier in an $m^{th}$ iteration of joint data processing | | | $n^{th}$ identifier in an $n^{th}$ iteration of joint data processing | | |
| | Sub-identifier 1 corresponding to X | Sub-identifier 2 corresponding to Y | Sub-identifier 3 corresponding to a result | Sub-identifier 1 corresponding to X | Sub-identifier 2 corresponding to Y | Sub-identifier 3 corresponding to a result |
| --- | --- | --- | --- | --- | --- | --- |
| First participant A(owning service data X) | 3 | 4 | 5 | 3 | 6 | 7 |
| Second participant B(owning service data Y) | 3 | 4 | 5 | 3 | 6 | 7 |

In Table 1, the $m^{th}$ iteration of joint data processing is joint data processing that has been performed before the $n^{th}$ iteration of joint data processing. In the two iterations of joint data processing, a specific value of the service data X of the first participant A does not change. Therefore, both values of the sub-identifier 1 are 3, which indicates reuse of the service data X. A specific value of the service data Y of the second participant A changes. Therefore, the value of the sub-identifier 2 changes from 4 to 6. In addition, a result of joint data processing also changes, and a sub-identifier corresponding to the result changes from 5 to 7.

In an implementation, when the $n^{th}$ identifier is determined, values of different sub-identifiers can be the same or can be different. For example, values of a sub-identifier 1, a sub-identifier 2, and a sub-identifier 3 can be the same or can be different. The above-mentioned Table 1 shows different sub-identifier values.

Step S320: In a predetermined trusted interaction manner and based on the $n^{th}$ identifier and initial seeds of the multiple participants, the multiple participants separately determine respective random arrays. Any random array includes multiple random numbers respectively corresponding to multiple sub-identifiers.

In addition, during presumed reconstruction, the random arrays of the multiple participants satisfy a predetermined relationship. A random array belongs to private data of a participant, and is not aggregated into a participant or an untrusted third party in a plaintext form. Assume that the random arrays of the multiple participants can be reconstructed together, the multiple random arrays satisfy the predetermined relationship.

The predetermined trusted interaction manner includes an interaction manner between the multiple participants by using MPC, for example, the multiple participants perform interaction by using homomorphic encryption or secret sharing; or an interaction manner between the multiple participants by using a trusted third party.

In a first manner, when the multiple participants perform interaction by using MPC, multiple random numbers can be tations. Different execution bodies can generate random numbers based on the initial seeds and the $n^{th}$ identifier of the participants. For a specific implementation process, refer to subsequent descriptions. Details are omitted here for simplicity.

In this embodiment, the $n^{th}$ identifier and the initial seed are used to generate a random number. Regardless of which manner is used, for any participant, step S320 can include the following step 1 and step 2.

Step 1: Generate the random array based on the $n^{th}$ identifier and the initial seed of the participant. The $n^{th}$ identifier can be combined with the initial seed, and the random array is generated based on combined data. Specifically, the $n^{th}$ identifier and the initial seed can be combined in a manner of splicing, exclusive OR, addition, subtraction, etc.

The $n^{th}$ identifier includes multiple sub-identifiers. When combining, multiple random number seeds at the current iteration can be generated based on combinations of the multiple sub-identifiers in the $n^{th}$ identifier and the initial seed of the participant, and a random array is generated based on the multiple random number seeds by using a pseudo-random algorithm. By using a combination of the sub-identifiers and the initial seed, when the initial seed is the same and the sub-identifiers are different, corresponding random numbers are different. When multiple random numbers in a random array are different, a peer party can be prevented from reversely deriving a feature of service data by using obtained data, thereby improving data privacy.

For example, the $n^{th}$ identifier includes a sub-identifier 1, a sub-identifier 2, and a sub-identifier 3. The three sub-identifiers are separately combined with the initial seed to obtain three random number seeds: seed1, seed2, and seed3. A random number 1 can be obtained based on seed1 by using the pseudo-random algorithm, a random number 2 can be obtained based on seed2 by using the pseudo-random algorithm, and a random number 3 can be obtained based on seed3 by using the pseudo-random algorithm. As such, random numbers respectively corresponding to the sub-identifiers are obtained. Multiple random numbers can be used as elements in a random array to form a random array. The random array formed by the random numbers can be unable to satisfy the predetermined relationship, and can be subsequently corrected.

The pseudo-random algorithm is such an algorithm that when a random number generation method is determinate, and a random number seed is determinate, random numbers generated after each iteration of running are the same. The pseudo-random algorithm includes a pseudo-random algorithm based on an advanced encryption standard (AES), another common algorithm, etc.

Any one of the above-mentioned random numbers can be a single number, or can be a random number matrix that includes multiple random numbers. When a random number is implemented by using a corresponding random number matrix, and multiple random number types are obtained, multiple corresponding elements in multiple random number matrices can be separately generated by using the pseudo-random algorithm based on the multiple random number seeds and a predetermined matrix dimension quantity, and the multiple random number matrices form the random array. The predetermined matrix dimension quantity can be predetermined based on a matrix dimension quantity of service data of the participant. For example, in the example shown in FIG. 2, the matrices U1 and U2 in step 1 have the same dimension as the service data matrix X.

A quantity of random number matrices included in the random array can be predetermined based on a quantity of participants. For example, when there are two participants in total, any random array can include (2+1) three random number matrices.

Step 2: Enable, in the predetermined trusted interaction manner and based on the locally generated random array and a random array generated by another participant, the multiple participants to separately determine random arrays that satisfy the predetermined relationship.

Theoretically, the random arrays of the multiple participants should satisfy the predetermined relationship in a case of presumed reconstruction. For a participant, the random array is private data in a joint data processing process, and cannot be obtained by another participant in a plaintext or another manner. Therefore, the random arrays of the multiple participants are not clustered in a participant in a plaintext manner.

The predetermined relationship can be a*b=c, aT*b=c, or a predetermined relationship in another form. An example in which the predetermined relationship is a*b=c is used below for description. Assume that the random array corresponding to the first participant A includes random numbers a0, b0, and c0, and the random array corresponding to the second participant B includes random numbers a1, b1, and c1. In this case, the two random arrays need to satisfy the predetermined relationship a*b=c, and a=a0+a1, b=b0+b1, and c=c0+c1, that is, the multiple random arrays needs to satisfy a relationship (a0+a1)(b0+b1)=(c0+c1). When a quantity of participants is greater than two, random arrays of the participants satisfy the following predetermined relationship:

$$(a0+a1+a2 \ldots )(b0+b1+b2 \ldots )=(c0+c1+c2 \ldots )$$

Random numbers that have the same number belong to a random array of the same participant. For example, a2, b2, and c2 belong to a random array of the same participant. a0, b0, and c0, a1, b1, and c1, a2, b2, and c2 can be random numbers, or can be random number matrices.

Initial seeds can be different for different participants. Any participant can determine an initial seed of the participant according to a predetermined rule, and store the initial seed as private data. For example, each participant can randomly generate an initial seed, or can determine the initial seed in another manner. Different participants determine different initial seeds. The initial seeds are different, so the random arrays generated by using the initial seeds and the $n^{th}$ identifier can be different.

Step S330: When a first sub-identifier in the $n^{th}$ identifier exists in a correspondence between sub-identifiers and confidential data, obtain first confidential data corresponding to the first sub-identifier.

The first confidential data are obtained by fusing first service data and a corresponding first random number in advance. The first service data can be service data of a participant serving as an execution body, or service data of another participant.

The above-mentioned correspondence can include only one sub-identifier and corresponding confidential data, or can include multiple sub-identifiers and corresponding confidential data. The above-mentioned correspondence can be obtained in advance based on confidential data exchange between multiple participants in the $m^{th}$ iteration of joint data processing process that has been performed, and can be stored in a storage space of the participant, or can be pre-stored in each participant in another manner.

All the multiple participants store the correspondence. Because the confidential data are obtained by fusing the service data and the random number, the private data are not leaked. Therefore, all the multiple participants can store the correspondence.

The fusion of the service data and the random number can include multiple forms, for example, can be summing, exclusive OR, or subtraction. For example, the first confidential data can be obtained based on a difference between the first service data and the corresponding first random number.

In this step, when the first confidential data corresponding to the first sub-identifier are obtained, the first confidential data corresponding to the first sub-identifier can be obtained from the above-mentioned correspondence. Before the first confidential data are obtained, sub-identifiers in the $n^{th}$ identifier can be first separately matched against corresponding sub-identifiers in the correspondence, and a successfully matched sub-identifier is determined as the first sub-identifier. When the matching succeeds, it is considered that a corresponding same sub-identifier exists in the above-mentioned correspondence, that is, there are confidential data that can be reused. When the matching fails, it is considered that no corresponding same sub-identifier exists in the above-mentioned correspondence, that is, there is no confidential data that can be reused.

The above-mentioned correspondence can separately store confidential data corresponding to sub-identifiers corresponding to different service data. For example, refer to the correspondence shown in Table 2.

TABLE 2

| Sub-identifier 1 corresponding to service data X | | Sub-identifier 2 corresponding to service data Y | |
|---|---|---|---|
| Value of the sub-identifier 1 | Confidential data | Value of the sub-identifier 2 | Confidential data |
| 3 | xxx1 | 5 | Xxx3 |
| 4 | xxx2 | 6 | Xxx4 |

In Table 2, the left two columns provide a correspondence related to the sub-identifier 1 corresponding to the service data X, and the right two columns provide a correspondence related to the sub-identifier 2 corresponding to the service data Y. xxx represents a specific value that is not exposed. Any piece of confidential data can be a combination of multiple pieces of data.

When the sub-identifiers in the $n^{th}$ identifier are separately matched against the corresponding sub-identifiers in the above-mentioned correspondence, the sub-identifiers and the corresponding sub-identifiers should be corresponding to the same service data. For example, the $n^{th}$ identifier includes the sub-identifier 1 (whose value is 3) corresponding to the service data X and the sub-identifier 2 (whose value is 7) corresponding to the service data Y. When the sub-identifiers in the $n^{th}$ identifier are matched against the correspondence in Table 2, the sub-identifier 1 can be separately matched against values in the left two columns in Table 2, and the sub-identifier 2 can be separately matched against values in the right two columns in Table 2. It can be learned that the confidential data xxxi corresponding to the sub-identifier 1 whose value is 3 is successfully matched, the sub-identifier 1 is the first sub-identifier, and the confidential data xxxi is the first confidential data.

When the $n^{th}$ identifier includes the successfully matched sub-identifier, it indicates that confidential data that can be reused exist in the above-mentioned correspondence. After the first confidential data are obtained, step S340 can continue to be performed. When the sub-identifiers in the $n^{th}$ identifier do not exist in the above-mentioned correspondence, it indicates that there is no confidential data that can be reused in the above-mentioned correspondence. In this case, the participant can determine confidential data by fusing service data of the participant and a corresponding random number in a random array of the participant. The current iteration of joint data processing is performed by using MPC based on exchange between the confidential data and confidential data of another participant. That is, the multiple participants perform mutual exchange based on confidential data of the multiple participants according to a given processing procedure, and do not reuse the confidential data.

Step S340: Perform the current iteration of joint data processing with another participant by using secure multi-party computation MPC based on exchange of other confidential data and respective first confidential data. The other confidential data are obtained by fusing other service data and a corresponding random number.

The fusion of the other service data and the corresponding random number can include multiple forms, for example, can be summing, exclusive OR, or subtraction. In an implementation, the other confidential data can be obtained based on a difference between the other service data and the corresponding random number.

In step S340, all the multiple participants can determine the first confidential data from the correspondence stored in the multiple participants, and the multiple participants do not need to exchange the first confidential data, but only exchange other confidential data. Therefore, bandwidth consumption can be reduced. Especially when the service data belong to a high-dimensional characteristic matrix, bandwidth consumption can be reduced to a greater extent.

The following describes the above-mentioned embodiment with reference to the joint data processing instance shown in FIG. 2.

It can be understood from the description of step S310 that, for any participant, sub-identifiers in the $n^{th}$ identifier of the participant are respectively corresponding to service data of different participants, and it can be understood from the description of step S320 that the sub-identifiers are corresponding to the random numbers. Therefore, the random numbers are corresponding to the service data. It can be understood from the description of step S330 that corresponding confidential data can be obtained by fusing a random number and service data that are corresponding to each other. Therefore, the confidential data are also corresponding to the sub-identifier.

Referring to the example shown in FIG. 2, the random array of participant Alice includes U1, V1, and W1, where the random number U1 is corresponding to the service data X of participant Alice, the random number V1 is corresponding to the service data Y of participant Bob, and the random number W1 is corresponding to the result of joint data processing. The random numbers U1 and U2 are used to fuse data related to the service data X to obtain confidential data including D1 and D2, and both Alice and Bob can obtain the confidential data. Fusion of the service data and the corresponding random number can be separately performed in the multiple participants, for example, D1 is obtained from participant Alice, and D2 is obtained from participant Bob.

In the above-mentioned correspondence, when participant Alice and participant Bob obtain the confidential data including D1 and D2, participant Alice and participant Bob do not need to exchange confidential data X2, D1, and D2, but exchange only other confidential data, for example, other confidential data including Y1, E1, and E2.

Figure 4:
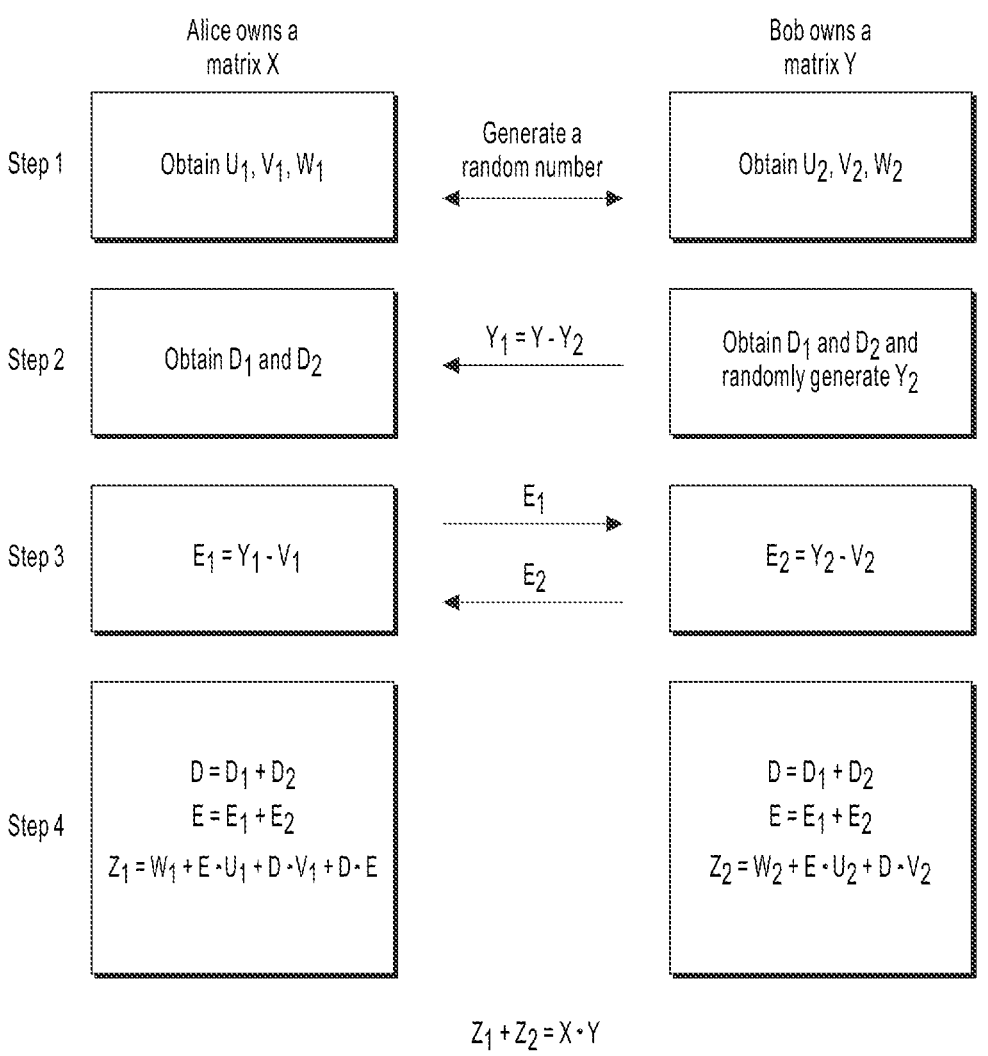
FIG. 4 is a schematic diagram illustrating another type of joint data processing corresponding to FIG. 2.

Referring to FIG. 4, FIG. 4 is a schematic diagram illustrating another type of joint data processing corresponding to FIG. 2, where exchange of some confidential data is omitted. Compared with FIG. 2, exchange for X2, D1, and D2 is reduced in data exchange between participant Alice and participant Bob in FIG. 4. When the service data X are a high-dimensional characteristic matrix, and the service data Y are a low-dimensional characteristic matrix, a reduction proportion of such exchange data is larger, which can greatly reduce bandwidth consumption.

In this example, it can also be learned that confidential data corresponding to a sub-identifier of any value can include multiple pieces of data, for example, can include D1 and D2.

The joint data processing shown in FIG. 4 is merely a processing process performed by multiple participants based on MPC. In practice, based on MPC, joint data processing between the multiple participants can include multiple implementations, and details are omitted here for simplicity.

When step S330 is performed, when a second sub-identifier in the $n^{th}$ identifier does not exist in the correspondence, and the second sub-identifier corresponds to second service data, the participant can further obtain second confidential data, and add the second sub-identifier and the corresponding second confidential data into the correspondence.

The second confidential data are obtained by fusing the second service data and a second random number corresponding to the second sub-identifier. The second service data can be service data of a participant serving as an execution body, or service data of another participant. The another participant refers to a participant in the multiple participants except the participant serving as the execution body.

The second sub-identifier can be any sub-identifier whose value does not exist in the correspondence, or can be a sub-identifier selected from multiple sub-identifiers whose values do not exist in the correspondence. For example, a sub-identifier corresponding to the service data can be selected as the sub-identifier.

The step of adding the second sub-identifier and the second confidential data into the above-mentioned correspondence can be a step performed after the participant receives a related instruction, or can be a step that can be performed when a condition that the second sub-identifier does not exist in the correspondence is satisfied.

In another embodiment of this specification, step S320 can include multiple implementations. In the interaction manner using the trusted third party, step S320 of enabling the multiple participants to separately determine respective random arrays can be performed by using a schematic diagram shown in FIG. 5.

Figure 5:
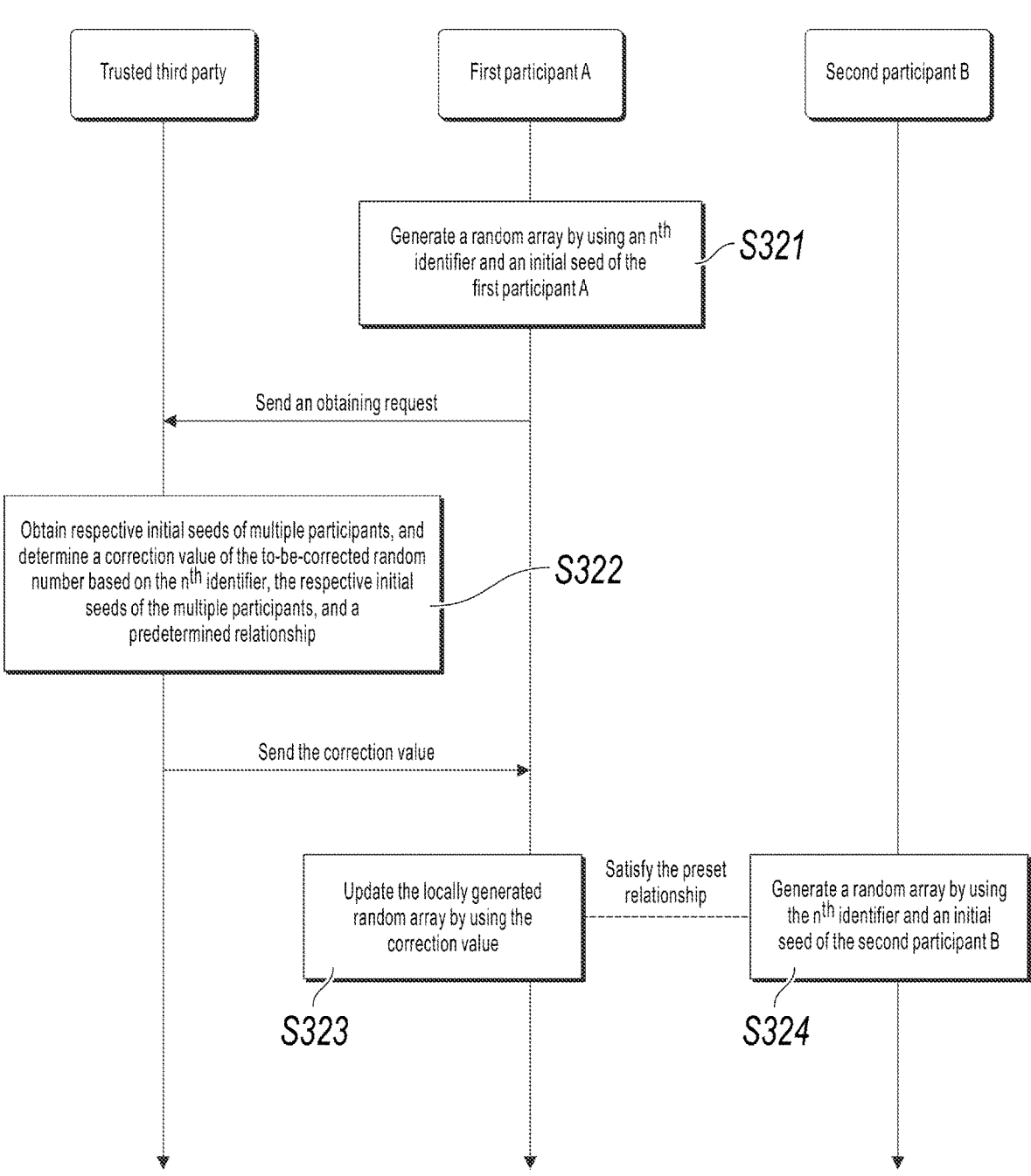
FIG. 5 is a schematic flowchart illustrating jointly obtaining a random array by multiple participants, according to an embodiment.

FIG. 5 is a schematic flowchart illustrating jointly obtaining a random array by multiple participants, according to an embodiment. A first participant A is a participant selected from the multiple participants, and a second participant B is any participant other than the first participant in the multiple participants. A process of jointly obtaining the random array by the multiple participants includes the following steps S321 to S324.

Step S321: The first participant A generates a random array by using an $n^{th}$ identifier and an initial seed of the first participant A, where the random array includes a to-be-corrected random number and a non-to-be-corrected random number. The first participant A sends an obtaining request carrying the $n^{th}$ identifier to a trusted third party, and the trusted third party can receive the obtaining request sent by the first participant A.

Step S322: The trusted third party obtains respective initial seeds of the multiple participants, determines a correction value of the to-be-corrected random number based on the nt identifier, the respective initial seeds of the multiple participants, and a predetermined relationship satisfied by multiple random arrays, and sends the correction value to the first participant A. The first participant A can receive the correction value returned by the trusted third party.

Step S323: The first participant A updates the locally generated random array by using the correction value.

Step S324: The second participant B generates a random array by using the nt identifier and an initial seed of the second participant B, where a predetermined relationship is satisfied between the random array updated by the first participant A and a random array of another participant during presumed reconstruction. Step S324 can be performed before or after step S321, or can be simultaneously performed.

The initial seeds of the multiple participants, including the initial seed of the first participant A and the initial seed of the second participant B, can be separately sent to the trusted third party in advance. During sending, the initial seeds can be encrypted and then sent to the trusted third party, so as to improve security of the initial seeds.

In steps S321 and S324, the random arrays generated by the multiple participants separately by using the initial seeds and the $n^{th}$ identifier belong to initial random arrays, and the random arrays do not satisfy the predetermined relationship during presumed reconstruction. In this embodiment, the random array of the first participant A can be corrected and updated, so each random array satisfies the predetermined relationship during presumed reconstruction.

In this embodiment, only the random array of the first participant A needs to be updated, and random arrays of other participants than the first participant A can be directly used without being updated.

In step S321, multiple random numbers in the random array of the first participant A can be divided into a to-be-corrected random number and a non-to-be-corrected random number. The to-be-corrected random number can be a default random number in the random array of the first participant A, or can be selected from the random array according to a predetermined selection rule. There can be one or more to-be-corrected random numbers. In addition, when generating the random array, the first participant A can generate all random numbers in the random array, or can generate only a non-to-be-corrected random number in the random array.

For example, the random array of the first participant A includes five random numbers: a, b, c, d, and e, where a and b are to-be-corrected random numbers, and c, d, and e are non-to-be-corrected random numbers. The first participant A can generate only specific values of c, d, and e, and does not generate specific values of a and b, or can generate specific values of a, b, c, d, and e.

In steps S321 and S324, the first participant A and the second participant B can generate the random arrays in multiple implementations. For example, multiple random number seeds at the current iteration can be generated based on combinations of the multiple sub-identifiers in the $n^{th}$ identifier and the initial seed of the participant, and a random array is generated based on the multiple random number seeds by using a pseudo-random algorithm.

When a random number is implemented by using a corresponding random number matrix, and the random array is generated by using the pseudo-random algorithm based on the multiple random number seeds, multiple corresponding elements in multiple random number matrices can be separately generated by using the pseudo-random algorithm based on the multiple random number seeds and a predetermined matrix dimension quantity, and the multiple random number matrices form the random array.

In step S321, the first participant A can generate an obtaining request carrying the $n^{th}$ identifier. The obtaining request can be used to obtain a correction value of a to-be-corrected random number corresponding to the $n^{th}$ identifier. The obtaining request can use an existing request format, and the $n^{th}$ identifier is added to a first specified field of the obtaining request, for example, a data field. A specified identifier used to identify that the request is to obtain a correction value of a to-be-corrected random number can also be added to a second specified field in the obtaining request.

When the to-be-corrected random number is a default random number in the random array of the first participant A, the trusted third party can also obtain the default random number in advance. Therefore, when generating the obtaining request, the first participant A does not need to add the to-be-corrected random number to the obtaining request.

When the to-be-corrected random number is selected from the random array of the first participant A before the obtaining request is generated, the first participant A can generate an obtaining request carrying the $n^{th}$ identifier and the to-be-corrected random number, and send the obtaining request to the trusted third party. The to-be-corrected random number is carried in the obtaining request, so the trusted third party can obtain the $n^{th}$ identifier and the to-be-corrected random number from the obtaining request. After receiving the obtaining request sent by the first participant A, the trusted third party can further obtain the to-be-corrected random number from the obtaining request.

In this embodiment, the trusted third party can be a single device, or can include several computing units. To further improve security of multi-party joint data processing, the trusted third party or a computing unit included in the trusted third party can be implemented by using a trusted computing unit that has a trusted execution environment (TEE).

When the trusted third party includes multiple trusted computing units, the multiple trusted computing units can belong to the same trusted computing cluster, or not belong to a trusted computing cluster.

When sending the obtaining request to the trusted third party, the first participant A can specifically perform remote attestation (RA) with the trusted computing unit in the trusted third party, establish an RA channel, and send the obtaining request to the corresponding trusted computing unit in the trusted third party by using the RA channel. Specifically, the RA channel can be established after remote attestation succeeds. RA is confirmation of trustworthiness of the trusted computing unit by the participant. After the attestation succeeds, the first participant A can transmit data with the trusted computing unit by using a more secure RA channel.

The trusted third party or a computing device implemented by using the trusted computing unit can more securely and reliably provide data transmission for the first participant, thereby ensuring data transmission security, and further improving security of the joint data processing process.

In step S322, the trusted third party can obtain the respective initial seeds of the multiple participants from a data storage platform. The trusted third party can store the multiple initial seeds into the data storage platform after obtaining the respective initial seeds of the multiple participants in advance. The multiple initial seeds can be encrypted and stored in the data storage platform.

In an implementation, when determining the correction value of the to-be-corrected random number in step S322, the trusted third party can determine the correction value by using the following step 11 and step 12:

Step 11: Generate respective random arrays for the multiple participants based on the respective initial seeds of the multiple participants and the $n^{th}$ identifier, including a random array generated for the first participant A. During implementation of this step, the implementation provided in step S321 can be used, and details are not described again.

Step 12: Determine a correction value of a to-be-corrected random number in the random array of the first participant A by using a generated random array of another participant and a predetermined relationship between multiple random arrays.

For example, the random array generated by the trusted third party for the first participant A includes random number matrices a0, b0, and c0*, and a random array generated for the second participant B includes random number matrices a1, b1, and c1. Assume that c0* is a to-be-corrected random number, and a0, b0, a1, b1, and c1 are non-to-be-corrected random numbers. The following predetermined relationship exists between the random number matrices of the first participant A and the second participant B:

$$(a0+a1)(b0+b1)=(c0+c1).$$

The following equation can be obtained based on the predetermined relationship, and the correction value c0 of the to-be-corrected random number c0* is determined based on the equation:

$$c0=(a0+a1)(b0+b1)-c1.$$

The above-mentioned content is described by using only an example in which c0 owned by the first participant A is used as a to-be-corrected random number. In practice, either of a0 and b0 can be used as a to-be-corrected random number.

When sending the correction value to the first participant A, the trusted third party can obtain a key of the first participant A from the data storage platform, encrypt the correction value by using the key of the first participant A, and send an encrypted correction value to the first participant A. The data storage platform can store the key of the first participant. The key can be sent by the first participant to the trusted third party in advance. The key can be a symmetric key or can be an asymmetric key.

In an implementation, the key of the first participant A and the initial seed of each participant can be directly stored in the trusted third party, instead of being stored in the data storage platform. When the computing unit in the trusted third party uses a trusted computing unit, because a memory space of the trusted computing unit is limited, the initial seed and the key of the first participant A can be stored in the data storage platform, so as to save the memory space of the trusted computing unit.

When the trusted third party is implemented by using a trusted computing unit, the first participant A can send the key to the trusted third party by using an RA channel established with the trusted computing unit, so as to improve key security.

In step S323, when the correction value is a result obtained after encryption is performed by using the key of the first participant A, the first participant A can decrypt the correction value by using the key of the first participant A, and update a first random array by using a decrypted correction value.

When the random array of the first participant A is updated by using the correction value, the correction value can be directly used as a value of a to-be-corrected random number in the random array.

In another implementation of this embodiment, to further control a delay of interaction between the first participant A and the trusted third party and improve processing efficiency, when the first participant A is selected from the multiple participants, a participant that is disposed in the same local area network as the trusted third party is selected as the first participant A. When interacting with the trusted third party, the first participant interacts with the trusted third party through the local area network to perform data transmission.

During device deployment, the trusted third party (for example, a TEE) can also be deployed in a local area network in which the first participant A is located, so access between the trusted third party and the first participant A becomes near-end access. Such near-end access can clearly shorten time consumed for data transmission between the trusted third party and the first participant A. Especially when joint data processing is performed at a high frequency, a large quantity of random arrays need to be generated. This near-end access can more clearly shorten a delay and improve processing efficiency.

In this embodiment, when the first participant A and the trusted third party are located in the same local area network, data transmission, attestation, etc. between the first participant A and the trusted third party can be performed by using the local area network. For example, when the first participant A can send the obtaining request to the trusted third party through the local area network, the trusted third party can receive the obtaining request through the local area network. The trusted third party can send the correction value to the first participant A through the local area network, and the first participant A can receive the correction value through the local area network.

In conclusion, in this embodiment, the multiple partici-pants separately generate the random arrays, and only the first participant needs to obtain the correction value from the trusted third party, and the multiple participants do not need to interact with the trusted third party, which can reduce interaction times, shorten a delay, and improve efficiency.

Figure 6:
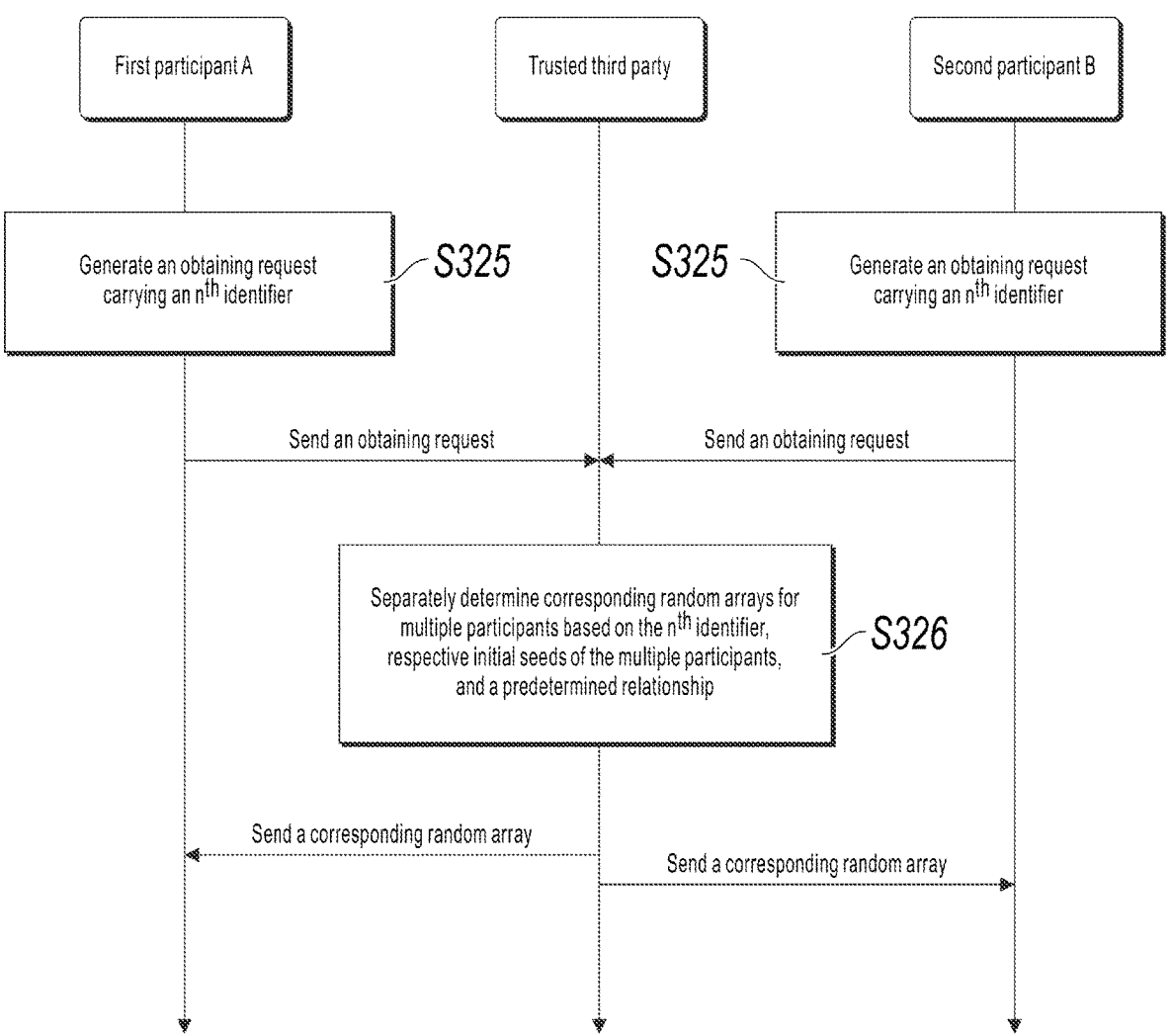
FIG. 6 is another schematic flowchart illustrating jointly obtaining a random array by multiple participants, according to an embodiment.

In the interaction manner using the trusted third party, step S320 of enabling the multiple participants to separately determine respective random arrays can alternatively be performed by using a schematic diagram shown in FIG. 6.

FIG. 6 is another schematic flowchart illustrating jointly obtaining a random array by multiple participants, according to an embodiment. The multiple participants perform the same operation. For ease of description, two participants are used as an example for description, for example, a first participant A and a second participant B. The two partici-pants are any participants. A process of jointly obtaining the random array by the multiple participants in this embodi-ment includes the following steps S325 and S326.

Step S325: The multiple participants, including the first participant A and the second participant B, separately gen-erate an obtaining request carrying an $n^{th}$ identifier, and send the obtaining request to a trusted third party. The trusted third party separately receives obtaining requests respec-tively sent by the first participant A and the second partici-pant B. The obtaining request is used to obtain a random array of the participant.

Step S326: The trusted third party separately determines corresponding random arrays for the multiple participants based on the $n^{th}$ identifier, respective initial seeds of the multiple participants, and the above-mentioned predeter-mined relationship, including a random array generated for the first participant A and a random array generated for the second participant B. Then, the trusted third party separately sends the random arrays to corresponding participants. The first participant A and the first participant B separately receive the random arrays returned by the trusted third party.

The first participant A and the second participant B can generate the obtaining requests at the same time or at different time; and send the obtaining requests to the trusted third party at the same time or at different time.

When receiving the first obtaining request, the trusted third party can perform step S326. After receiving the first obtaining request, the trusted third party can further receive an obtaining request sent by another participant, and when determining that the obtaining request carries the $n^{th}$ iden-tifier, send, to another participant, a random array that is in the multiple random arrays determined based on the $n^{th}$ identifier and that is corresponding to the another partici-pant.

In step S326, when separately generating the random arrays corresponding to the multiple participants, the trusted third party can generate, for any participant, multiple ran-dom number seeds at the current iteration based on combi-nations of an initial seed of the participant and the multiple sub-identifiers in the $n^{th}$ identifier, and generate a random array corresponding to the participant by using the pseudo-random algorithm based on the multiple random number seeds. The trusted third party can separately determine the random arrays of the multiple participants in the above-mentioned manner.

To enable the random arrays of the participants to satisfy the predetermined relationship, the trusted third party can further correct random numbers in the random arrays of the participants by using the predetermined relationship and the random arrays of the multiple participants that are separately determined in the above-mentioned manner. The trusted third party can divide multiple random numbers in the random arrays of the multiple participants into a to-be-corrected random number and a non-to-be-corrected random number, determine a correction value of the to-be-corrected random number by using the non-to-be-corrected random number and the predetermined relationship, and correct the to-be-corrected random number by using the correction value, to obtain an updated random array. After an update operation, the predetermined relationship is satisfied between the random arrays of the multiple participants. The to-be-corrected random number can be a default number, or can be determined randomly or in another manner.

For example, random number matrices a0, b0, and c0* are generated for the first participant A, and random number matrices a1, b1, and c1 are generated for the second par-ticipant B, where c0* is a to-be-corrected random number matrix, and a0, b0, a1, b1, and c1 are non-to-be-corrected random number matrices. A dimension quantity of each random number matrix is related to a dimension quantity of service data of the multiple participants. Therefore, the dimension quantity and an element quantity of each random number matrix can be predetermined. For the first partici-pant A and the second participant B, their random number matrices have the following predetermined relationship:

$$(a0+a1)(b0+b1)=(c0+c1).$$

The correction value c0 of the to-be-corrected random number matrix c0* can be determined by using the follow-ing equation:

$$c0=(a0+a1)(b0+b1)-c1.$$

The above-mentioned content is described by using only an example in which c0 owned by the first participant A is used as a to-be-corrected random number. In practice, any one of a0, b0, a1, b1, and c1 can be used as a to-be-corrected random number.

In step S326, the random array sent by the trusted third party to the participant can be data encrypted by using the key of the participant, so security in a transmission process can be improved.

To improve availability of the trusted third party, the trusted third party can include multiple computing units, each computing unit is preconfigured with the initial seeds of the multiple participants, and when an obtaining request of the participant is received, step S326 can be performed. Regardless of which computing unit receives the obtaining request carrying the $n^{th}$ identifier, multiple same random arrays can be generated for the multiple participants. When a computing amount of a computing unit is overloaded, another computing unit can easily undertake a computing task of generating a random array, so as to implement seamless switching between multiple computing units. In addition, after a computing unit sends a random array to any first participant, if the computing unit is faulty, any second participant can obtain a corresponding random array from another computing unit, so the predetermined relationship is satisfied between random arrays of the first participant and the second participant. As such, high availability during random array generation can be improved, and further, high availability during joint data processing can be improved.

To improve security of the trusted third party, the trusted third party can be implemented by using a trusted computing unit that has a trusted execution environment (TEE), or a computing unit in the trusted third party can be implemented by using a trusted computing unit. The initial seed, the plaintext of the $n^{th}$ identifier, and processing processes such as determining the random arrays of the multiple participants can all be performed in the trusted computing unit, and a plaintext of confidential data cannot be obtained by the outside, thereby improving security.

When the trusted third party includes multiple computing units, the trusted third party can further include a load balancing unit, configured to perform load balancing on computing tasks of the multiple computing units. The load balancing unit can receive obtaining requests sent by the multiple participants, determine a computing unit for forwarding according to a remaining computing capability of each computing unit, and forward the obtaining request to the determined computing unit, so as to implement load balancing. For example, any computing unit in the trusted third party can receive the obtaining request forwarded by the load balancing unit.

In this specification, "first" in the first sub-identifier, the first confidential data, the first random number, the first service data, etc., and corresponding "second" in the following are merely for ease of differentiation and description, and do not have any limitation.

The above-mentioned content of the embodiments shown in FIG. 5 and FIG. 6 focuses on describing differences from the embodiment shown in FIG. 3 and other embodiments. For same parts, references can be made between the embodiments.

The above-mentioned content describes specific embodiments of this specification, and other embodiments are within the scope of the appended claims. In some situations, the actions or steps described in the claims can be performed in an order different from the order in the embodiments and the desired results can still be achieved. In addition, the process depicted in the accompanying drawings does not necessarily need an illustrated particular execution order to achieve the desired results. In some implementations, multitasking and concurrent processing is feasible or can be advantageous.

FIG. 7 is a schematic block diagram illustrating a multiparty joint data processing apparatus, according to an embodiment. The apparatus 700 is configured to perform private joint data processing on service data of multiple participants. The service data include feature data of multiple objects. The apparatus embodiment corresponds to the method embodiment shown in FIG. 3. The apparatus 700 is deployed in any participant of the multiple participants, and includes: an identifier determining module 710, configured to: when an $n^{th}$ iteration of joint data processing is performed, determine a same $n^{th}$ identifier of the multiple participants at a current iteration of joint data processing, where the $n^{th}$ identifier includes sub-identifiers respectively corresponding to the service data of the multiple participants; a random number determining module 720, configured to, in a predetermined trusted interaction manner and based on the $n^{th}$ identifier and initial seeds of the multiple participants, the multiple participants separately determine respective random arrays, where the random arrays include multiple random numbers respectively corresponding to multiple sub-identifiers, and the random arrays of the multiple participants satisfy a predetermined relationship during presumed reconstruction; a data acquisition module 730, configured to: when a first sub-identifier in the $n^{th}$ identifier exists in a correspondence between sub-identifiers and confidential data, obtain first confidential data corresponding to the first sub-identifier, where the first confidential data are obtained by fusing first service data and a corresponding first random number in advance; and a joint processing module 740, configured to: perform the current iteration of joint data processing with another participant by using MPC based on exchange of other confidential data and respective first confidential data, where the other confidential data are obtained by fusing other service data and a corresponding random number.

In an implementation, the feature data include at least one of the following: basic attribute information, association relationship information, interaction information, and historical behavior information; and the object includes one of the following categories: a user, a product, and an event.

In an implementation, the first service data are service data of the participant or service data of the another participant.

In an implementation, the correspondence is obtained based on exchange of confidential data between the multiple participants in an $m^{th}$ iteration of joint data processing process that has been performed.

In an implementation, the identifier determining module 710 is specifically configured to: when service data of a participant in the current iteration of joint data processing are the same as service data of the participant in joint data processing that has been performed, determine a sub-identifier corresponding to the service data in the joint data processing that has been performed as a sub-identifier of the service data at the current iteration; and when the service data of the participant in the current iteration of joint data processing are not the same as the service data of the participant in the joint data processing that has been performed, determine the sub-identifier of the service data at the current iteration based on a value different from the sub-identifier corresponding to the service data in the joint data processing that has been performed.

In an implementation, that the identifier determining module 710 determines the sub-identifier of the service data at the current iteration based on a value different from the sub-identifier corresponding to the service data in the joint data processing that has been performed includes: determining the sub-identifier of the service data at the current iteration based on an updated value of a counter corresponding to the service data, where the multiple participants have the same initial value of the counter corresponding to the service data, and update modes are the same.

In an implementation, the trusted interaction manner includes an interaction manner between the multiple participants by using MPC; or an interaction manner between the multiple participants by using a trusted third party.

In an implementation, in the interaction manner using the trusted third party, the random number determining module 720 is specifically configured to: when the participant is a selected participant, generate a random array by using the $n^{th}$ identifier and an initial seed of the participant, where the random array includes a to-be-corrected random number; and send an obtaining request carrying the $n^{th}$ identifier to the trusted third party, receive a correction value that is of the to-be-corrected random number and returned by the trusted third party, and update the locally generated random array by using the correction value, where the correction value is determined based on the $n^{th}$ identifier and the respective initial seeds of the multiple participants; and when the participant is not a selected participant, generate the random array by using the $n^{th}$ identifier and the initial seed of the participant.

For execution of the above-mentioned implementation, refer to the method embodiment shown in FIG. 5.

In an implementation, when the participant is a selected participant, the participant is disposed in the same local area network as the trusted third party; and the step of sending an obtaining request carrying the $n^{th}$ identifier to the trusted third party includes: sending, to the trusted third party by using the local area network, the obtaining request carrying the $n^{th}$ identifier; and the step of receiving a correction value that is of the to-be-corrected random number and returned by the trusted third party includes: receiving, by using the local area network, the correction value that is of the to-be-corrected random number and returned by the trusted third party.

In an implementation, in the interaction manner using the trusted third party, the random number determining module 720 is specifically configured to: generate an obtaining request carrying the $n^{th}$ identifier, and send the obtaining request to the trusted third party; and receive a random array returned by the trusted third party for the participant, where the trusted third party separately determines corresponding random arrays for the multiple participants based on the $n^{th}$ identifier, the respective initial seeds of the multiple participants, and the predetermined relationship.

For execution of the above-mentioned implementation, refer to the method embodiment shown in FIG. 6.

In an implementation, in the interaction manner using the trusted third party, the trusted third party includes several computing units; and the computing units include a trusted computing unit that has a trusted execution environment (TEE).

In an implementation, the random number determining module 720 is specifically configured to: generate the random array based on the $n^{th}$ identifier and the initial seed of the participant; and enable, in the predetermined trusted interaction manner and based on the locally generated random array and a random array generated by another participant, the multiple participants to separately determine random arrays that satisfy the predetermined relationship.

In an implementation, that the random number determining module 720 generates the random array based on the $n^{th}$ identifier and the initial seed of the participant includes: generating multiple random number seeds at the current iteration based on combinations of the multiple sub-identifiers in the $n^{th}$ identifier and the initial seed of the participant; and generating the random array by using a pseudo-random algorithm based on the multiple random number seeds.

In an implementation, the random number is implemented by using a corresponding random number matrix; and that the random number determining module 720 generates the random array by using a pseudo-random algorithm based on the multiple random number seeds includes: separately generating multiple corresponding elements in multiple random number matrices by using the pseudo-random algorithm based on the multiple random number seeds and a predetermined matrix dimension quantity, where the multiple random number matrices form the random array.

In an implementation, the apparatus 700 further includes an identifier matching module (not shown in the figure). The identifier matching module is configured to: before the first confidential data are obtained, separately match the sub-identifiers in the $n^{th}$ identifier against corresponding sub-identifiers in the correspondence, and determine a successfully matched sub-identifier as the first sub-identifier.

In an implementation, the apparatus 700 further includes a data addition module (not shown in the figure): The data addition module is configured to: when a second sub-identifier in the $n^{th}$ identifier does not exist in the correspondence, and the second sub-identifier is corresponding to second service data, obtain second confidential data, where the second confidential data are obtained by fusing the second service data and a second random number corresponding to the second sub-identifier; and add the second sub-identifier and the corresponding second confidential data to the correspondence.

In an implementation, the apparatus 700 further includes a data fusion module and a data exchange module (not shown in the figure): The data fusion module is configured to: when the sub-identifiers in the $n^{th}$ identifier do not exist in the correspondence, determine confidential data by fusing service data of the participant and a corresponding random number in a random array of the participant; and the data exchange module is configured to perform the current iteration of joint data processing by using the MPC based on exchange between the confidential data and confidential data of the another participant.

In an implementation, the first confidential data are obtained based on a difference between the first service data and the corresponding first random number.

The above-mentioned apparatus embodiment corresponds to the method embodiment. For specific descriptions, refer to some descriptions of the method embodiment. Details are omitted here for simplicity. The apparatus embodiment is obtained based on a corresponding method embodiment, and has the same technical effect as the corresponding method embodiment. For specific descriptions, refer to the corresponding method embodiment.

An embodiment of this specification further provides a computer readable storage medium that stores a computer program, and when the computer program is executed in a computer, the computer is enabled to perform the method according to any one of FIG. 1 to FIG. 6.

An embodiment of this specification further provides a computing device, including a memory and a processor, where the memory stores executable code, and when the processor executes the executable code, the method in any one of FIG. 1 to FIG. 6 is implemented.

The embodiments in this specification are described in a progressive way. For the same or similar parts of the embodiments, references can be made to the embodiments. Each embodiment focuses on a difference from other embodiments. Particularly, storage medium and computing device embodiments are similar to a method embodiment, and therefore are described briefly. For related parts, references can be made to related descriptions in the method embodiment.

A person skilled in the art should be aware that in the above-mentioned one or more examples, functions described in the embodiments of this specification can be implemented by hardware, software, firmware, or any combination thereof. When this specification is implemented by software, the functions can be stored in a computer readable medium or transmitted as one or more instructions or code in the computer readable medium.

The objectives, technical solutions, and beneficial effects of the embodiments of this specification are further described in detail in the above-mentioned specific implementations. It should be understood that the earlier-described descriptions are merely specific implementations of the embodiments of this specification, but are not intended to limit the protection scope of this specification. Any modification, equivalent replacement, or improvement made based on the technical solutions of this specification shall fall within the protection scope of this specification.

What is claimed is:

1. A computer-implemented method for bandwidth-controlled, private, multi-party joint data processing, comprising:

when an $n^{th}$ iteration of joint data processing on service data of multiple participants is performed, determining a same $n^{th}$ identifier of the multiple participants at a current iteration of joint data processing, wherein the service data of multiple participants comprises feature data of multiple objects, and wherein the same $n^{th}$ identifier comprises sub-identifiers respectively corresponding to the service data of multiple participants;

in a predetermined trusted interaction manner and based on the same $n^{th}$ identifier and initial seeds of the multiple participants, the multiple participants separately determine respective random arrays, wherein the respective random arrays comprise multiple random numbers respectively corresponding to multiple sub-identifiers;

when a first sub-identifier in the same $n^{th}$ identifier exists in a correspondence between sub-identifiers and confidential data, obtaining first confidential data corresponding to the first sub-identifier, wherein the first confidential data is obtained by fusing first service data and a corresponding first random number in advance, and wherein, before obtaining first confidential data corresponding to the first sub-identifier:

separately matching the sub-identifiers in the same $n^{th}$ identifier against corresponding sub-identifiers in the correspondence; and determining a successfully matched sub-identifier as the first sub-identifier; and performing the current iteration of joint data processing with another participant using secure multi-party computation (MPC) based on exchange of other confidential data and respective first confidential data, wherein other confidential data is obtained by fusing other service data and a corresponding random number.

2. The computer-implemented method of claim 1, wherein:

the feature data of multiple objects comprises at least one of: basic attribute information, association relationship information, interaction information, and historical behavior information; and an object comprises one of: a user, a product, and an event.

3. The computer-implemented method of claim 1, wherein the first service data is service data of a participant or service data of the other participant.

4. The computer-implemented method of claim 1, wherein the correspondence is obtained based on exchange of confidential data between the multiple participants in an $m^{th}$ iteration of joint data processing process that has been performed.

5. The computer-implemented method of claim 1, wherein, when a second sub-identifier in the same $n^{th}$ identifier does not exist in the correspondence and the second sub-identifier corresponds to second service data:

obtaining second confidential data, wherein the second confidential data is obtained by fusing the second service data and a second random number corresponding to the second sub-identifier; and adding the second sub-identifier and corresponding second confidential data to the correspondence.

6. The computer-implemented method of claim 1, wherein when the sub-identifiers in the same $n^{th}$ identifier do not exist in the correspondence:

determining confidential data by fusing service data of a participant and a corresponding random number in a random array of the participant; and performing the current iteration of joint data processing by using the MPC based on exchange between the confidential data and confidential data of the other participant.

7. The computer-implemented method of claim 1, wherein the first confidential data is obtained based on a difference between the first service data and the corresponding first random number.

8. The computer-implemented method of claim 1, wherein the step of determining a same $n^{th}$ identifier of the multiple participants at a current iteration of joint data processing, comprises:

when service data of a participant in the current iteration of joint data processing are the same as service data of the participant in joint data processing that has been performed, determining a sub-identifier corresponding to the service data in the joint data processing that has been performed as a sub-identifier of the service data at the current iteration of joint data processing; and when the service data of the participant in the current iteration of joint data processing are not the same as the service data of the participant in the joint data processing that has been performed, determining the sub-identifier of the service data at the current iteration of joint data processing based on a value different from the sub-identifier corresponding to the service data in the joint data processing that has been performed.

9. The computer-implemented method of claim 8, wherein the step of determining the sub-identifier of the service data at the current iteration of joint data processing based on a value different from the sub-identifier corresponding to the service data in the joint data processing that has been performed, comprises: determining the sub-identifier of the service data at the current iteration of joint data processing based on an updated value of a counter corresponding to the service data, wherein the multiple participants have a same initial value of the counter corresponding to the service data, and update modes are the same.

10. The computer-implemented method of claim 1, wherein the predetermined trusted interaction manner, comprises:

an interaction manner between the multiple participants using MPC; or an interaction manner between the multiple participants using a trusted third party.

11. The computer-implemented method of claim 10, wherein, in an interaction manner using a trusted third party, enabling the multiple participants to separately determine respective random arrays, comprises:

generating an obtaining request carrying the same $n^{th}$ identifier, and sending the obtaining request to the trusted third party; and receiving a random array returned by the trusted third party for a participant, wherein the trusted third party separately determines corresponding random arrays for the multiple participants based on the same $n^{th}$ identifier, the respective initial seeds of the multiple participants, and the predetermined trusted interaction manner.

12. The computer-implemented method of claim 10, wherein, in an interaction manner using a trusted third party, the trusted third party comprises several computing units; and the computing units comprise a trusted computing unit that has a trusted execution environment (TEE).

13. The computer-implemented method of claim 10, wherein, in an interaction manner using a trusted third party, enabling the multiple participants to separately determine respective random arrays, comprises:

when a participant is a selected participant, generating a random array by using the same $n^{th}$ identifier and an initial seed of the participant, wherein the random array comprises a to-be-corrected random number; and sending an obtaining request carrying the same $n^{th}$ identifier to the trusted third party, receiving a correction value that is of the to-be-corrected random number and returned by the trusted third party, and updating a locally generated random array by using the correction value, wherein the correction value is determined based on the same $n^{th}$ identifier and respective initial seeds of the multiple participants; and when the participant is not a selected participant, generating the random array by using the same $n^{th}$ identifier and the initial seed of the participant.

14. The computer-implemented method of claim 13, wherein when the participant is a selected participant, the participant is disposed in a same local area network as the trusted third party; and the step of sending an obtaining request carrying the same $n^{th}$ identifier to the trusted third party, comprises:

sending, to the trusted third party by using the same local area network, the obtaining request carrying the same $n^{th}$ identifier; and the step of receiving a correction value that is of the to-be-corrected random number and returned by the trusted third party comprises: receiving, by using the same local area network, the correction value that is of the to-be-corrected random number and returned by the trusted third party.

15. The computer-implemented method of claim 1, wherein enabling the multiple participants to separately determine respective random arrays, comprises:

generating a locally generated random array based on the same $n^{th}$ identifier and an initial seed of a participant; and enabling, in the predetermined trusted interaction manner and based on the locally generated random array and a random array generated by another participant, the multiple participants to separately determine random arrays that satisfy the predetermined trusted interaction manner.

16. The computer-implemented method of claim 15, wherein the step of generating the random array based on the same $n^{th}$ identifier and the initial seed of the participant, comprises:

generating multiple random number seeds at the current iteration of joint data processing based on combinations of multiple sub-identifiers in the same $n^{th}$ identifier and an initial seed of the participant; and generating the random array by using a pseudo-random algorithm based on the multiple random number seeds.

17. The computer-implemented method of claim 16, wherein a random number is implemented by using a corresponding random number matrix;

and the step of generating the random array by using a pseudo-random algorithm based on the multiple random number seeds, comprises:

separately generating multiple corresponding elements in multiple random number matrices by using the pseudo-random algorithm based on the multiple random number seeds and a predetermined matrix dimension quantity, wherein the multiple random number matrices form the random array.

18. A non-transitory, computer-readable medium storing one or more instructions executable by a computer system to perform one or more operations for bandwidth-controlled, private, multi-party joint data processing, comprising:

when an $n^{th}$ iteration of joint data processing on service data of multiple participants is performed, determining a same $n^{th}$ identifier of the multiple participants at a current iteration of joint data processing, wherein the service data of multiple participants comprises feature data of multiple objects, and wherein the same $n^{th}$ identifier comprises sub-identifiers respectively corresponding to the service data of multiple participants;

in a predetermined trusted interaction manner and based on the same $n^{th}$ identifier and initial seeds of the multiple participants, the multiple participants separately determine respective random arrays, wherein the respective random arrays comprise multiple random numbers respectively corresponding to multiple sub-identifiers;

when a first sub-identifier in the same $n^{th}$ identifier exists in a correspondence between sub-identifiers and confidential data, obtaining first confidential data corresponding to the first sub-identifier, wherein the first confidential data is obtained by fusing first service data and a corresponding first random number in advance, and wherein, before obtaining first confidential data corresponding to the first sub-identifier:

separately matching the sub-identifiers in the same $n^{th}$ identifier against corresponding sub-identifiers in the correspondence; and determining a successfully matched sub-identifier as the first sub-identifier; and performing the current iteration of joint data processing with another participant using secure multi-party computation (MPC) based on exchange of other confidential data and respective first confidential data, wherein other confidential data is obtained by fusing other service data and a corresponding random number.

19. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations for bandwidth-controlled, private, multi-party joint data processing, comprising:

when an $n^{th}$ iteration of joint data processing on service data of multiple participants is performed, determining a same $n^{th}$ identifier of the multiple participants at a current iteration of joint data processing, wherein the service data of multiple participants comprises feature data of multiple objects, and wherein the same $n^{th}$ identifier comprises sub-identifiers respectively corresponding to the service data of multiple participants;

in a predetermined trusted interaction manner and based on the same $n^{th}$ identifier and initial seeds of the multiple participants, the multiple participants separately determine respective random arrays, wherein the respective random arrays comprise multiple random numbers respectively corresponding to multiple sub-identifiers;

when a first sub-identifier in the same $n^{th}$ identifier exists in a correspondence between sub-identifiers and confidential data, obtaining first confidential data corresponding to the first sub-identifier, wherein the first confidential data is obtained by fusing first service data and a corresponding first random number in advance, and wherein, before obtaining first confidential data corresponding to the first sub-identifier:

separately matching the sub-identifiers in the same $n^{th}$ identifier against corresponding sub-identifiers in the correspondence; and determining a successfully matched sub-identifier as the first sub-identifier; and performing the current iteration of joint data processing with another participant using secure multi-party computation (MPC) based on exchange of other confidential data and respective first confidential data, wherein other confidential data is obtained by fusing other service data and a corresponding random number.

\*  \*  \*  \*  \*